US008488745B2

(12) United States Patent
Cutler

(10) Patent No.: US 8,488,745 B2
(45) Date of Patent: Jul. 16, 2013

(54) ENDPOINT ECHO DETECTION

(75) Inventor: Ross G. Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 649 days.

(21) Appl. No.: 12/485,950

(22) Filed: Jun. 17, 2009

(65) Prior Publication Data

US 2010/0322387 A1 Dec. 23, 2010

(51) Int. Cl.
H04M 1/24 (2006.01)
H04M 3/08 (2006.01)
H04M 3/22 (2006.01)
H04M 9/08 (2006.01)

(52) U.S. Cl.
USPC .......................................... 379/3; 379/406.04

(58) Field of Classification Search
USPC ......... 379/3, 22.08, 202.01, 406.04; 381/104, 381/107
See application file for complete search history.

(56) References Cited

U.S. PATENT DOCUMENTS

| | | | | |
|---|---|---|---|---|
| 6,819,744 B1* | 11/2004 | Banwell et al. | ............... | 379/1.01 |
| 7,738,643 B1* | 6/2010 | Garrison et al. | ......... | 379/203.01 |
| 2005/0069114 A1 | 3/2005 | Eran | | |
| 2005/0213517 A1 | 9/2005 | Rodman et al. | | |
| 2005/0213739 A1 | 9/2005 | Rodman et al. | | |
| 2006/0146735 A1 | 7/2006 | Shaffer et al. | | |
| 2007/0291108 A1 | 12/2007 | Huber et al. | | |
| 2007/0291667 A1 | 12/2007 | Huber et al. | | |
| 2008/0013531 A1 | 1/2008 | Elliott et al. | | |
| 2008/0240370 A1* | 10/2008 | Wang et al. | ..................... | 379/30 |
| 2008/0292109 A1* | 11/2008 | Trump et al. | ................... | 381/66 |
| 2008/0310328 A1 | 12/2008 | Li et al. | | |
| 2010/0324891 A1* | 12/2010 | Cutler | .......................... | 704/210 |

OTHER PUBLICATIONS

"Kirovski, et al", "Spread Spectrum Watermarking of Audio Signals", retrieved at <<http://research.microsoft.com/en-us/um/people/darkok/tsp-darko-rico.pdf>>, Dec. 2, 2002.

"iVIEW Suite a Comprehensive Management Solution for Voice and Video Collaborative Communications", retrieved at <<http://www.radvision.com/NR/rdonlyres/C2918C1E-C9C3-40AC-8B85-3A21A98A999A/0/iVIEW_Suite_Datasheet_V56_Screen.pdf>>, Revision C, Apr. 2008, 2 pages.

* cited by examiner

*Primary Examiner* — Quoc D Tran

(57) ABSTRACT

Architecture that employs a signal (e.g., audible or inaudible sounds) to detect if endpoints of a communications session are sufficiently close to each other to induce echo, and then control (e.g., muting) is applied to one or more of the endpoints to prevent echo. The signals can be played and detected from the endpoints or a central conferencing component such as a multiple control unit (MCU). The MCU can provide support for legacy endpoints as well. When echo is detected, the offending endpoint(s) can be controlled to mute one or more onboard devices such as a speaker or microphone. The device(s) can be muted from a remote component or for a local component or locally by the endpoint user. A notification can be sent that notifies the endpoint user that the mute operation has been applied or should be applied to one or more of the local devices.

18 Claims, 8 Drawing Sheets

ENDPOINT ECHO DETECTION

BACKGROUND

Communications between electronic devices such as for group conferencing and data sharing can be negatively impacted by the introduction of echo into the communications channels. Ubiquitous computing extends not only to desktop computer and portable computers, but now to handheld devices and computing audio/video nodes such as for video conferencing systems. Thus, session participants can connect to the session using different modalities such as audio, video, text messaging, wireless phones, landline phones, IP phones, etc.

One such system generally referred to as a distributed meeting system provides high quality multi-party conferencing and recording of meetings, as well as rich browsing of archived meetings enhanced through a number of analysis techniques. This system typically employs multiple endpoint devices such as a 360-degree camera centrally positioned in the meeting room to visually capture people and activities in the meeting room, for example, on a whiteboard. Additionally, the system can also employ a microphone array that operates to simultaneously input and output audio signals, intended or otherwise.

The communications framework now has to deal with echo generation from many different sources such as sources located in the same room and/or nearby locations such as cubicles. For example, in a conference room, when User J joins a conference session in a conference room using a communications client on a notebook computer and a centrally located audio/video device. User T is in the same conference room and joins the meeting to share slides. Near end and far end echo, as well as howling, may then be induced thereby impacting session participation.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs a signal (e.g., audible or inaudible sounds) to detect if endpoints of a communications session are sufficiently close to each other to induce echo, and then control (e.g., muting) is applied to one or more of the endpoints to prevent echo. The signals can be played and detected from the endpoints or a central conferencing component such as a multiple control unit (MCU). The MCU can provide support for legacy endpoints as well.

If nearby endpoint(s) are detected that can or are causing echo, the offending endpoint(s) can be controlled to mute one or more onboard devices such as a speaker or microphone. The device(s) can be muted from a remote system (e.g., an MCU) or from a component of the endpoint. Alternatively, the device(s) can be muted locally by the endpoint user. In each case, a notification can be sent that notifies the endpoint user that the mute operation has been applied to one or more of the local devices. In one instance, the notification can be sent to the endpoint user to request that the user mute the microphone and/or speaker. The result of the mute can be manifested by changing presentation of associated icons or selections in a user interface.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
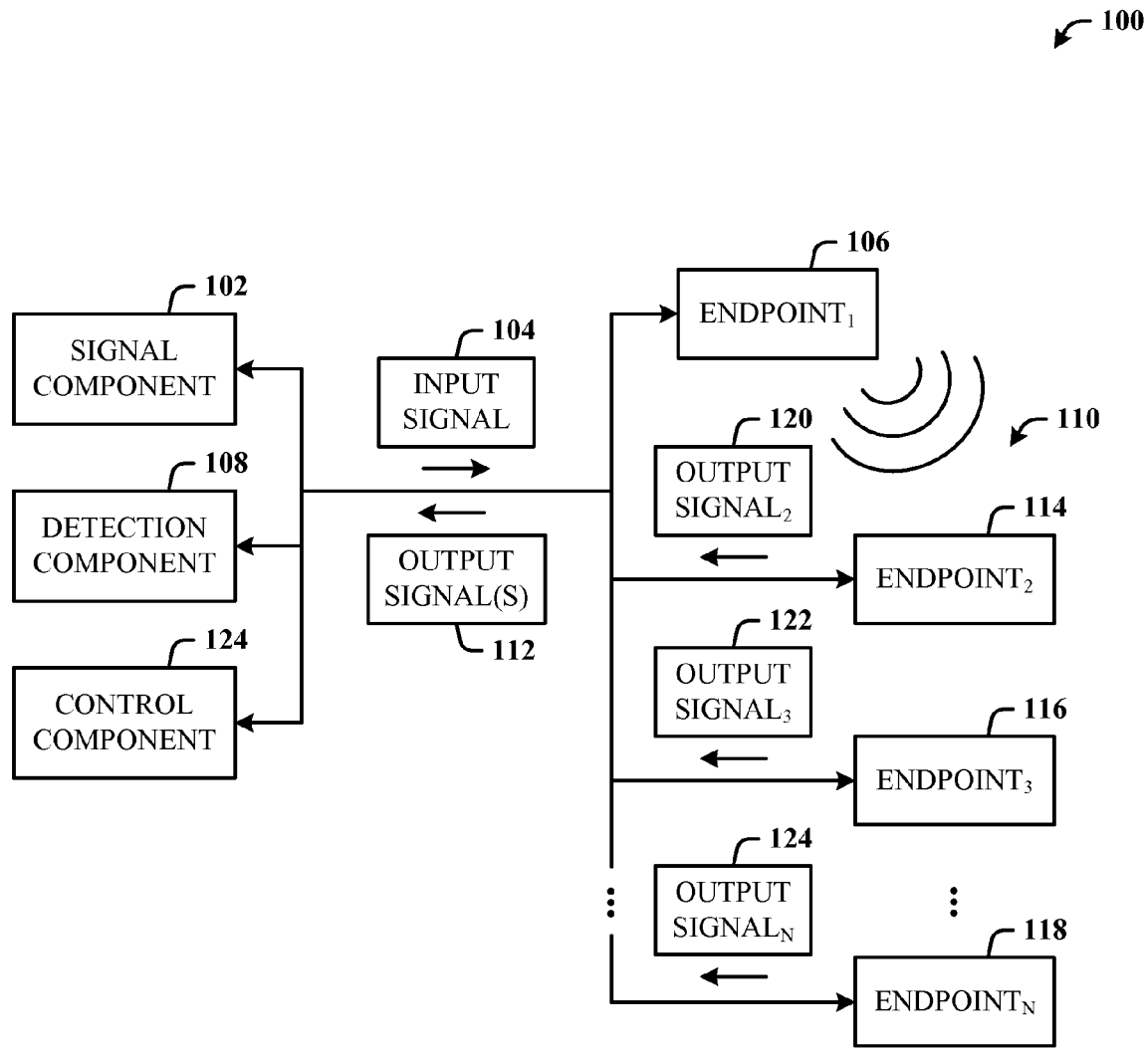
FIG. 1 illustrates computer-implemented echo management system in accordance with the disclosed architecture.

The disclosed architecture employs a signal (e.g., audible or inaudible sounds) to detect if endpoints of a communications session are sufficiently close to each other to induce echo, and then control (e.g., muting) is applied to one or more of the endpoints to prevent echo. The signals can be played and detected from the endpoints or a central conferencing component such as a multipoint control unit (MCU). The MCU can provide support for legacy endpoints as well.

When nearby endpoint(s) are detected that can cause echo, the offending endpoint(s) can be controlled to mute one or more onboard devices such as a speaker or microphone. The device(s) can be muted from a remote component or for a local component or locally by the endpoint user. A notification can be sent that notifies the endpoint user that the mute operation has been applied or should be applied to one or more of the local devices.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates computer-implemented echo management system 100 in accordance with the disclosed architecture. The system 100 includes a signal component 102 for generating an input signal 104 for input to an endpoint 106 of a communications session, and a detection component 108 for detecting the input signal 104 via one or more other endpoints 110 (e.g., as output signal(s) 112 of one or more of the other endpoints 110) of the session. The input signal 104 is processed through the endpoint 106 and output as the, or one of the, output signal(s) 112 for reception by one or more of the other endpoints 110, which some or all may be nearby (within reception range of the signal 104).

In other words, the input signal 104 is output (e.g., audibly) from the endpoint 106 as a tone or melody that is received by microphones of a second endpoint 114 of the other endpoints 110 and a third endpoint 116 of the other endpoints 110. The location of an Nth endpoint 118 of the other endpoints 110 is such that it is out of reception range and does not receive the input signal 104 as output by the endpoint 106, and thus, does not output a signal in response to the input signal 104. Accordingly, the second endpoint 114 receives and outputs the input signal 104 as a second output signal 120, the third endpoint 116 receives and outputs the input signal 104 as a third output signal 122, and the Nth endpoint 118 receives and outputs the input signal 104 as an Nth output signal 124. The second output signal 120 and the third output signal 122 can combine or be output sequentially to make the output signal(s) 112, which are detected by the detection component 108. The input signal 104 can be automatically sent if either of a speaker or a microphone of the endpoint 106 is unmuted.

The system 100 can also include a control component 124 for controlling the endpoint 106 to manage echo based on detection of the input signal 104 as the output signal(s) 112 via the one or more other endpoints 110 of the session. It is to be understood that the input signal 104 can be sent to any of the endpoint 106 and the other endpoints 110 to manage echo as described herein.

The signal component 102 can be an audio signal generator that generates the input signal 104 as an audio signal that is processed through the endpoint 106 to manage the echo using the detection component 108. The detection component 108 triggers the signal component 102 to generate the input signal 104 when a speaker or a microphone of the endpoint 106 is unmuted. The signal component 102, the detection component 108, and the control component 124 can be part of the endpoint 106 (and the other endpoints 110) such that the endpoint 106 generates and detects the input signal 104 internally and manages one or more devices (e.g., speaker, microphone) of the endpoint 106 to reduce (or eliminate) the echo.

Alternatively, the signal component 102, the detection component 108, and the control component 124 can be part of a central (remote) conferencing component, where the central conferencing component sends the input signal 104 through the endpoint 106, detects the output signal(s) 112 from the one or more of the other endpoints 110, and controls an audio device of the endpoint 106 and/or audio devices of the other endpoints 110 to reduce the echo. The detection component 108 can also decode the input signal 104 as transmitted through the one or more other endpoints 110 and sends a notification to the endpoint 106 to change state of the endpoint 106 based on the decoded signal(s).

Figure 2:
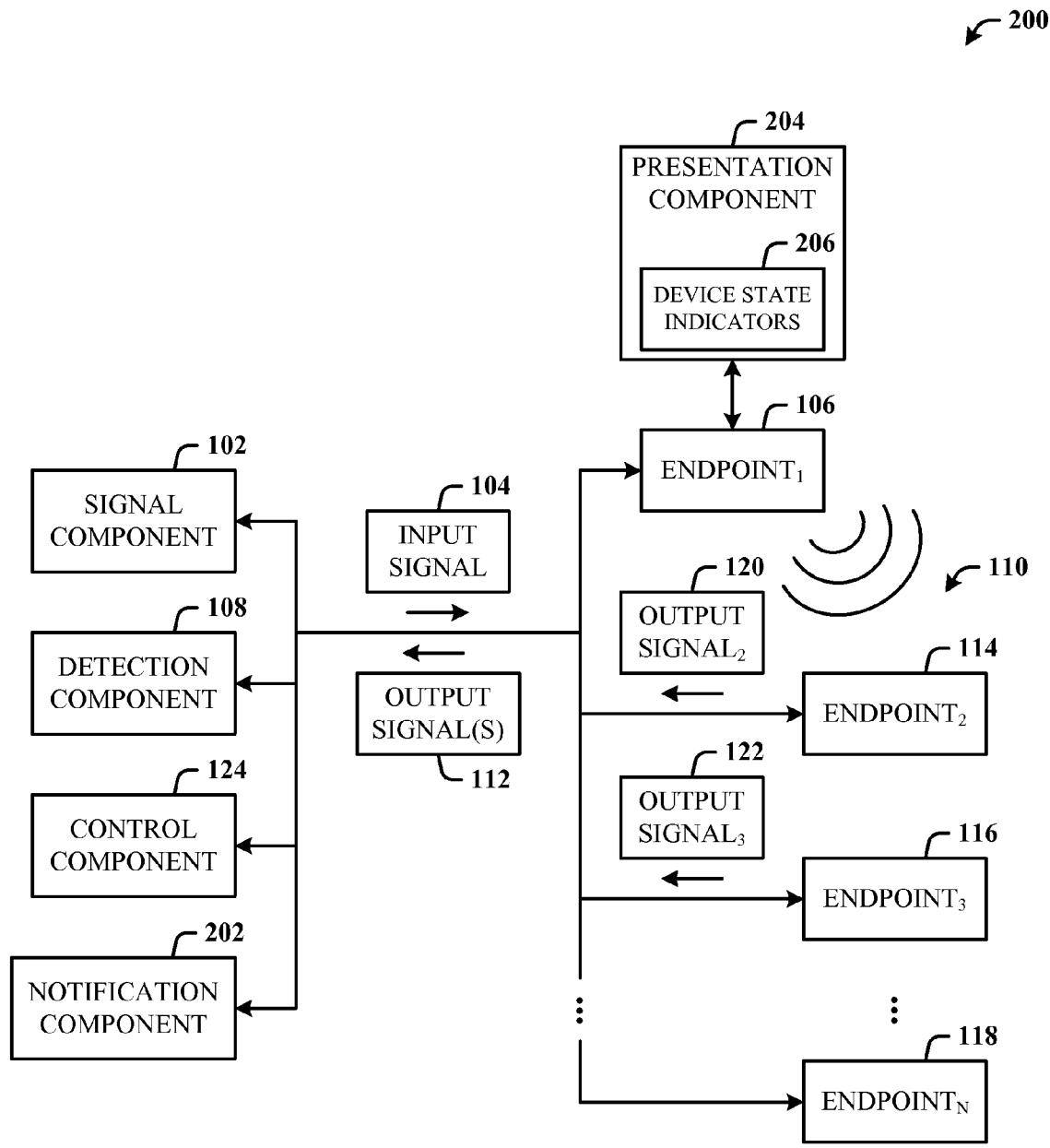
FIG. 2 illustrates an echo management system that further includes a notification capability for notifying a use of the endpoint of device state of the endpoint.

FIG. 2 illustrates an echo management system 200 that further includes a notification capability for notifying a user of the endpoint 106 of device state of the endpoint 106. The system 200 includes the components and entities of system 100 of FIG. 1, and further includes a notification component 202 for generating and sending notification information that indicates state of one or more devices of an endpoint. For example, if a microphone or speaker of the endpoint 106 is unmuted, the signal component 102 generates and sends the input signal 104 to the endpoint 106.

If echo is detected in either or both the far end or/and near end, the detection component 108 detects this, and the control component 124 can disable a speaker and/or microphone of the endpoint 106 to mitigate or terminate the echo effects caused by the endpoint 106. The notification component 202 then sends a notification to a presentation component 204 (e.g., user interface) of the endpoint 106 that further shows device state indicators 206 associated with the state of the signal devices (e.g., speaker, microphone, etc.). This is shown in the following figure. Note that each of the endpoint 106 and the other endpoints 110 can include a presentation component and associated device state indicators.

Figure 3:
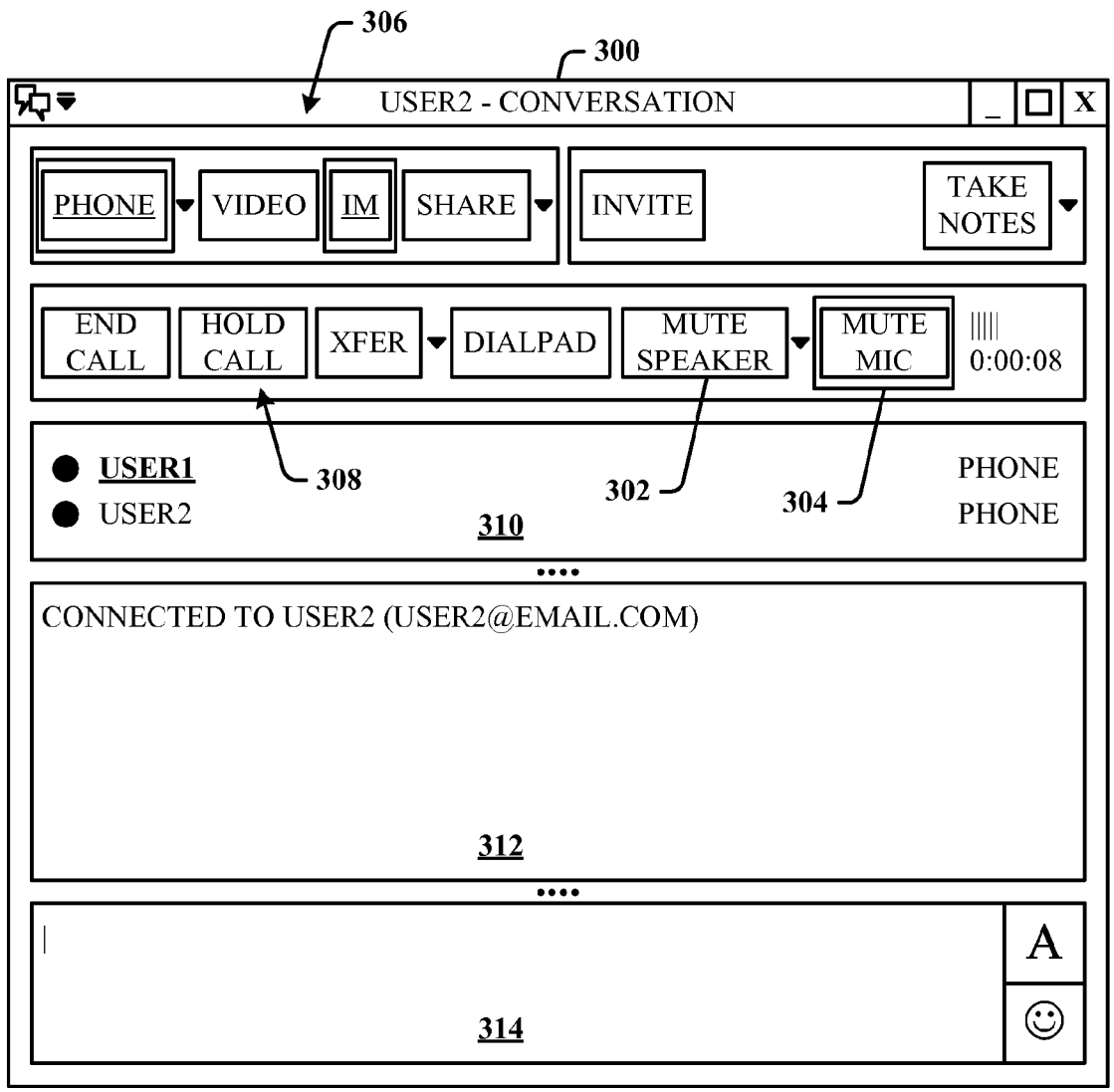
FIG. 3 illustrates an exemplary client user interface that shows indicators associated with endpoint device state.

FIG. 3 illustrates an exemplary client user interface 300 that shows indicators associated with endpoint device state. For example, where the input signal is an audio signal (audible or inaudible), the indicators can include a speaker indicator 302 and microphone indicator 304. A user of the associated endpoint can manually select either of the speaker or microphone to mute as a way to interact during the session and to eliminate echo, when echo is produced. In another example, the control component 124 can control the speaker indicator 302 to switch the speaker to a mute mode or an unmute mode, rather than via manual interaction. In this case, the notification can indicate to the user that the speaker has been muted or unmuted, or that the microphone has been muted or unmuted.

The user interface 300 also provides indicators and controls 306 for different modalities (e.g., phone, email, video, instant messaging, sharing, etc.) for connecting to the session and interacting with other endpoints (e.g., invite), as well as control buttons 308 for call control, connection modality panel 310 for the participants and modality used by other participants to the session, a connect panel 312 and a text entry panel 314 for entering and sending text.

The user interface 300 of the User1 endpoint indicates in the connection modality panel 310 that User1 is communicating to User2 by phone as well as by instant messaging. The connect panel 312 indicates the status and email address for texting to User2. The user interface 300 also shows that the microphone is muted by selection and emphasis (e.g., highlighting, underlining, change in indicator color, etc.) applied to the microphone indicator 304. The speaker is unmuted, as indicated by the lack of emphasis to the speaker indicator 302.

Figure 4:
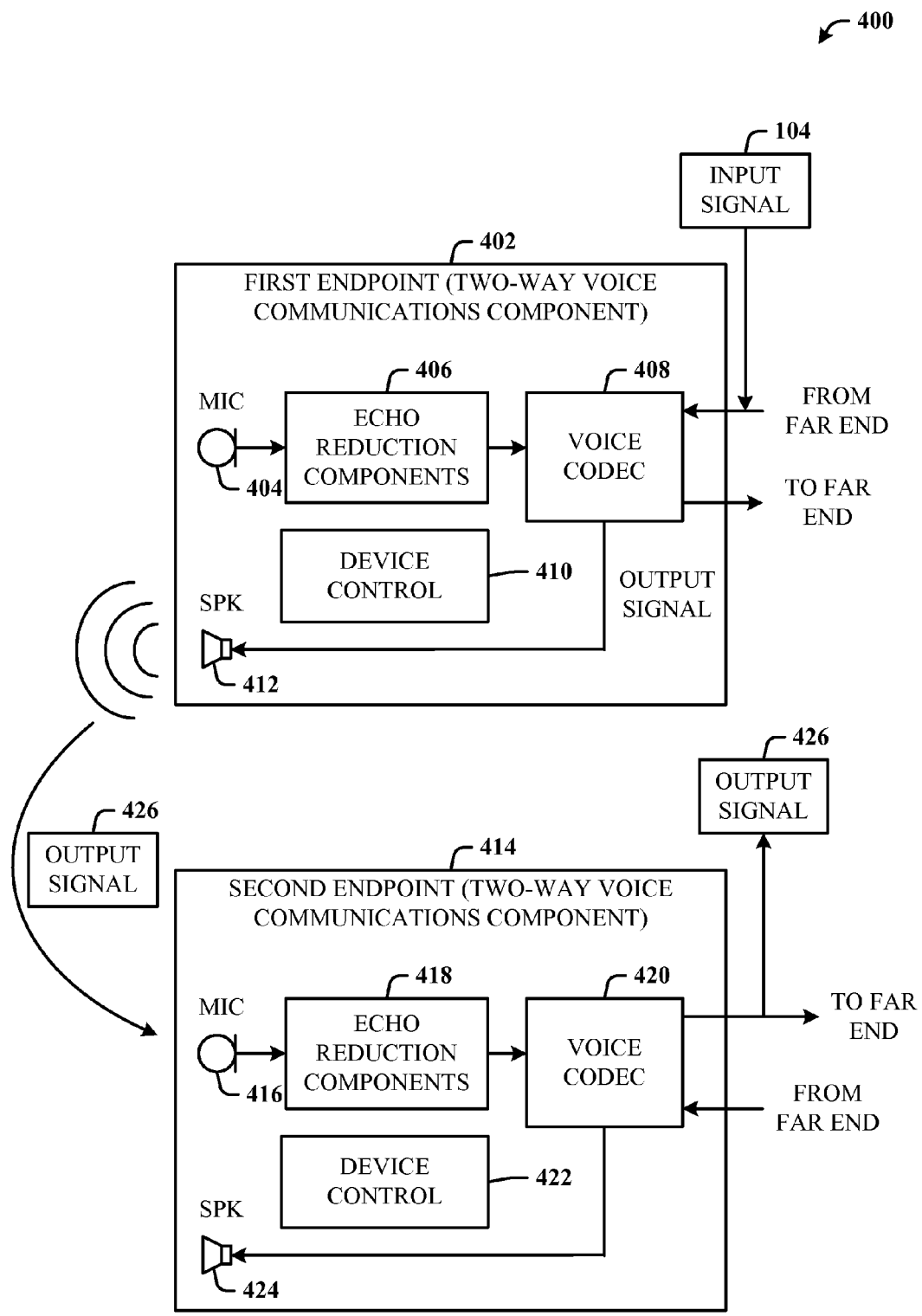
FIG. 4 illustrates a head-to-head arrangement of endpoints for echo management based on an input signal and device control.

FIG. 4 illustrates a head-to-head arrangement 400 of endpoints for echo management based on an input signal and device control. Here, a first endpoint 402 is a two-way communications device that includes a microphone 404 for receiving user input, as well as echo reduction components 406 for processing and mitigating acoustic echo created from voice, room acoustics, etc., and a first voice codec (coder/decoder) 408 for processing voice and other audio signals. The first endpoint 402 also includes device control 410 for muting and unmuting the microphone 404 and/or a speaker 412, as well as other onboard processing and control, for example.

Similarly, a second endpoint 414 is a two-way communications device that includes a microphone 416 for receiving user input, as well as echo reduction components 418 for processing and mitigating acoustic echo created from voice, room acoustics, etc., and a voice codec (coder/decoder) 420 for processing voice and other audio signals. The second endpoint 414 also includes device control 422 for muting and unmuting the microphone device 416 and/or a speaker device 424, as well as other onboard processing and control, for example.

In operation, the input signal 104 is input to the first endpoint 402 and processing through the voice codec 408 to the speaker 412 for output as an output signal 426 to the microphone 416 of the second endpoint 414. The output signal 426 is processed through the second endpoint 414 (the voice codec 420) and detected by the detection component 108 (of FIG. 1), in response to which the speaker 412 and/or the microphone 404 of the first endpoint 402 can then be muted.

When the first endpoint 402 joins a call, the MCU (remote conferencing component), for example, plays an audio signal (e.g., a short melody) to encode a client ID of the first endpoint 402 locally. Whenever the microphone 404 or speaker 412 is unmuted, the audio signal is generated and sent. The MCU attempts to detect the audio output signal 426 in the send signals (To Far End) second endpoint 414 on the call, and if detected, the MCU then sends the first endpoint 402 a "please mute" or "use handset/headset" message, or mutes the first endpoint microphone 404 and speaker 412, and sends the first endpoint 402 a muted notification. This notification can then be manifested in the user interface as muted selections for both the microphone 404 and speaker 412. The first endpoint 402 can perform the decoding; however, if the MCU performs the decoding, then legacy clients can be supported.

There can be many different (or unique) audio tones or melodies generated; however, only a few audio signals need to be utilized based on temporal probability. The audio can be detected using techniques such as like match filters.

In one operative example, consider a conference room scenario where User J joins the conference via a conference room audio/video device. The audio/video device plays a melody generated by the MCU to all receiving devices in the room. A User T joins the conference with a laptop computer. The laptop computer plays a melody generated by the MCU. The MCU then detects the User T melody from the audio/video device send signal from User J. The MCU then mutes User T's microphone/speaker, and sends a message to notify the User T client that the associated devices of the laptop computer have been muted. The client user interface can display a Microphone/Speaker Muted message and/or indication.

An inaudible sound can also be utilized to reduce tonal playback that can disrupt user interaction in the session. For example, spread spectrum watermarking can be used for the comfort noise in the receive signal and picked up by the computer microphone. The architecture can address headset scenarios as well, where a microphone and speaker are used on the headset. In this case, the computer system audio speaker can be used to generate a test signal.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
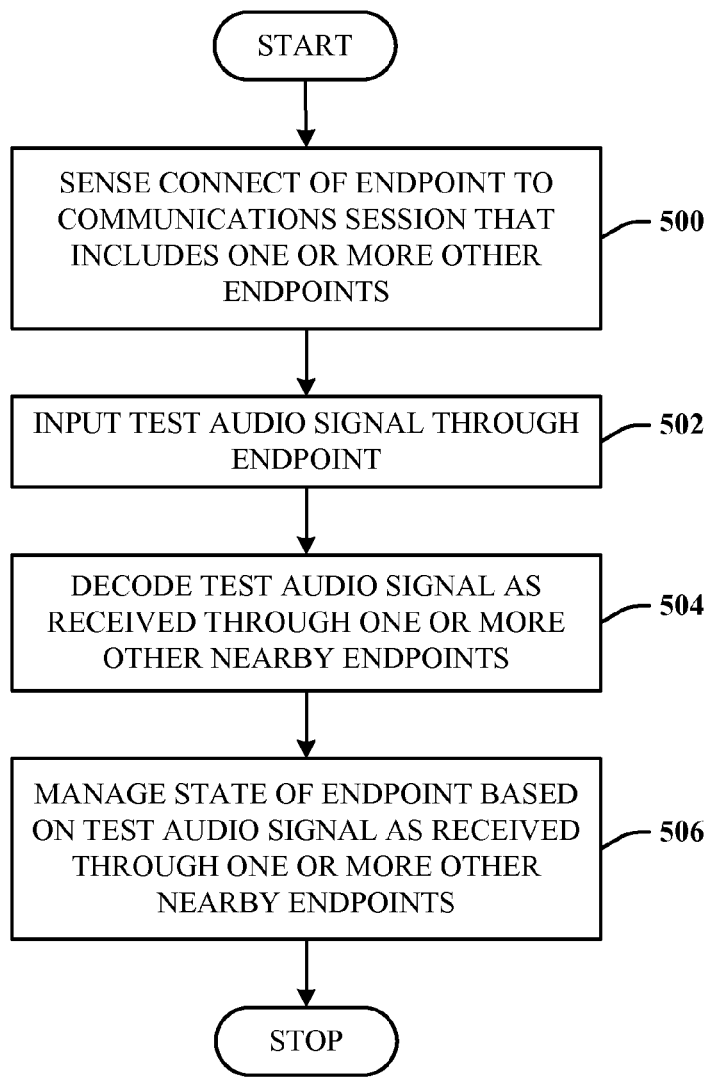
FIG. 5 illustrates a method of managing echo in a communications session.

FIG. 5 illustrates a method of managing echo in a communications session. At 500, connect of an endpoint to a communications session that includes one or more nearby endpoints is sensed. At 502, an audio signal is input to the endpoint to test for echo. At 504, the audio signal is decoded as output from the one or more nearby endpoints. At 506, the echo is managed by adjusting audio device state of the endpoint based on the audio signal as received from the one or more nearby endpoints.

Figure 6:
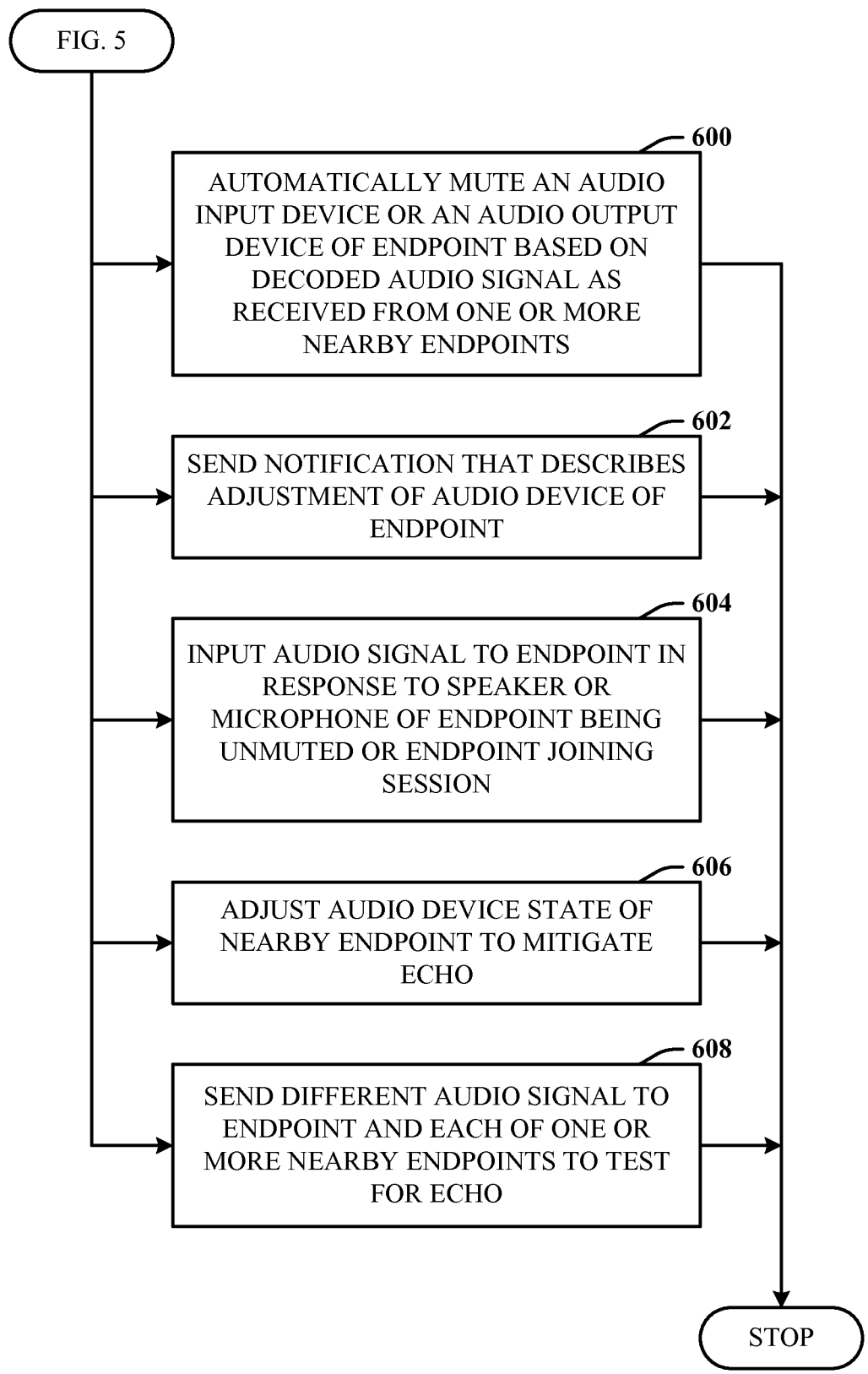
FIG. 6 illustrates additional aspects of the method of FIG. 5.

FIG. 6 illustrates additional aspects of the method of FIG. 5. At 600, an audio input device or an audio output device of the endpoint is automatically muted based on the decoded audio signal as received from the one or more nearby endpoints. At 602, a notification is sent that describes adjustment of the audio device of the endpoint. At 604, the audio signal is input to the endpoint in response to a speaker or a microphone of the endpoint being unmuted or the endpoint joining the session. Note that the audio signal can be decoded by the endpoint. At 606, audio device state of a nearby endpoint is adjusted to mitigate the echo. At 608, a different audio signal is sent to the endpoint and each of the one or more nearby endpoints to test for the echo.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
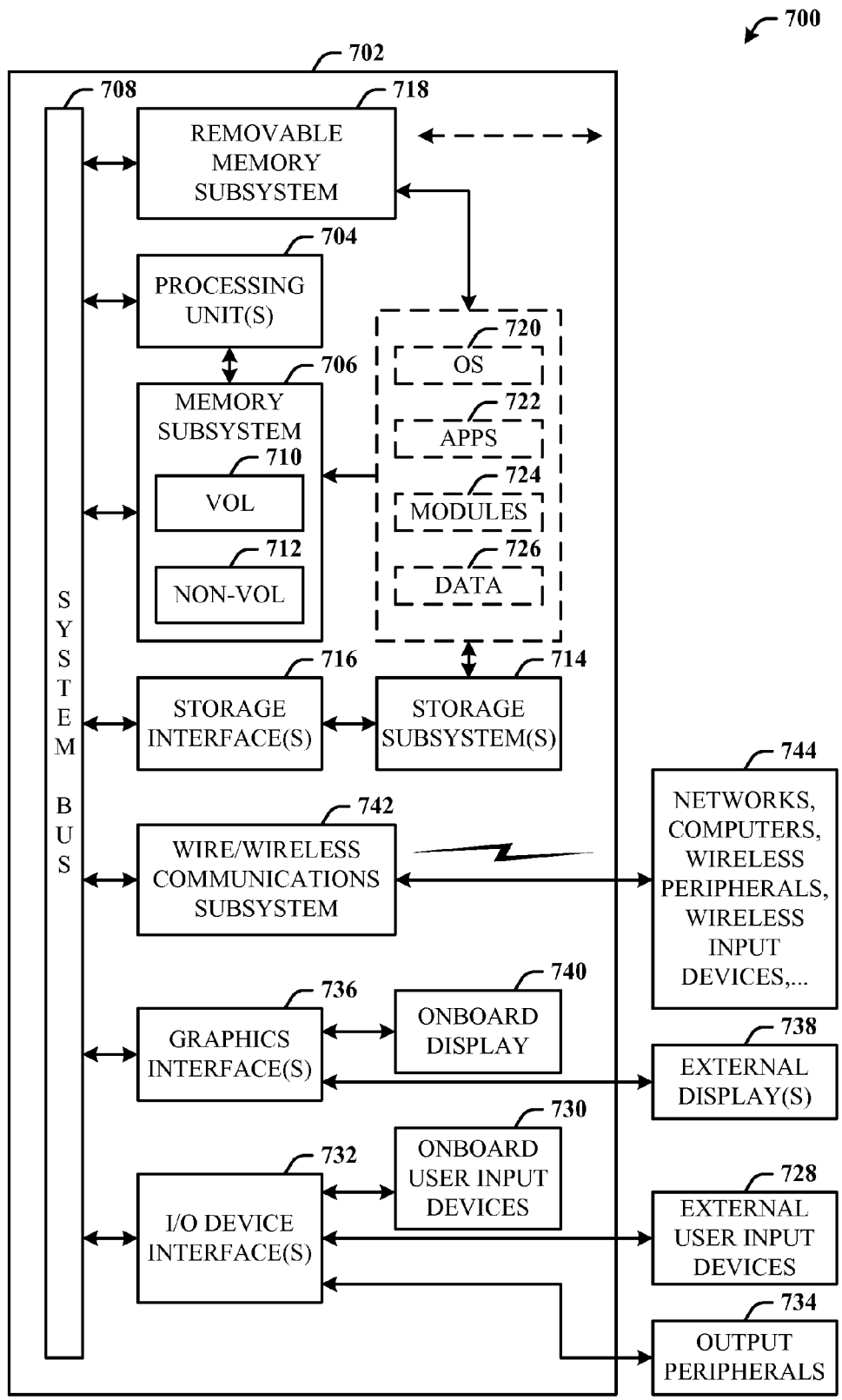
FIG. 7 illustrates a block diagram of a computing system operable to execute echo detection in accordance with the disclosed architecture.

Referring now to FIG. 7, there is illustrated a block diagram of a computing system 700 operable to execute echo detection in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

Portions of the computer 702 can include the one or more application programs 722, other program modules 724, and program data 726 and appropriate signal generation and detection hardware which form part of a remote conferencing component that includes the signal component 102, detection component 108, and control component 124 of FIG. 1, the notification component 202 of FIG. 2, and methods of FIGS. 5-6 for example. The computer 702 can be an endpoint that also includes these components and the presentation component 204 for presenting the notification and device state indicators 206, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wired/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wire Ethernet networks used in many offices.

Figure 8:
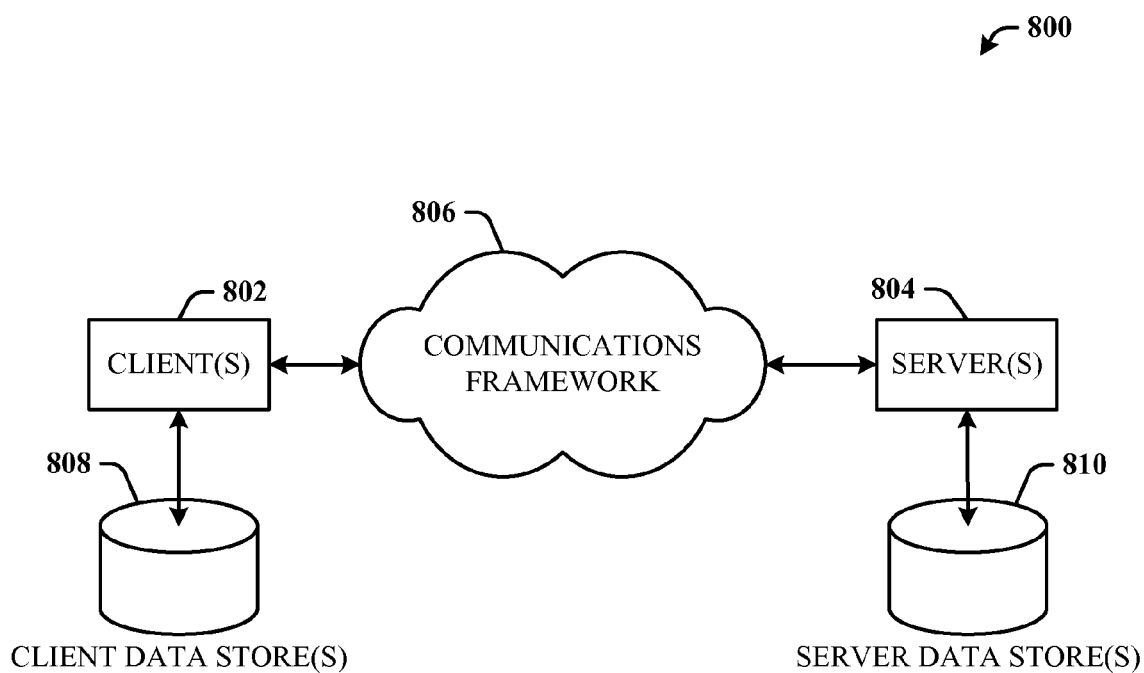
FIG. 8 illustrates a schematic block diagram of a computing environment that supports endpoint echo detection.

Referring now to FIG. 8, there is illustrated a schematic block diagram of a computing environment 800 that supports endpoint echo detection. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An echo management system, comprising:
   a signal component for generating a signal for input to an endpoint of a communications session;
   a detection component for detecting the signal via one or more other endpoints of the session; and
   a control component for controlling the endpoint to manage echo based on detection of the signal via the one or more other endpoints of the session;
   wherein the signal component, the detection component, and the control component are part of a central conferencing component, the central conferencing component automatically sends the signal through the endpoint, automatically detects for an offending endpoint based on the signal from the endpoint as an input to one or more of the other endpoints, and automatically controls an audio device of the endpoint or audio devices of the other endpoints to reduce the echo, the signal component adds unique watermark audio signals to corresponding session endpoint communications, each endpoint communication uniquely identified by the corresponding watermark audio signal, the offending endpoint is signaled using a notification message to mute an audio device when the detection component detects that the watermark audio signal corresponds to the offending endpoint.

2. The system of claim 1, wherein the signal component is an audio generator that generates an audio signal that is processed through the endpoint to manage the echo using the detection component.

3. The system of claim 1, wherein the detection component triggers the signal component to generate the signal when a speaker or a microphone of the endpoint is unmuted.

4. The system of claim 1, wherein the signal component, the detection component, and the control component are part of the endpoint such that the endpoint sends and detects the signal and manages one or more devices of the endpoint to reduce the echo.

5. The system of claim 1, wherein the detection component decodes the signal as transmitted through the one or more other endpoints and sends a notification to the endpoint to change state of the endpoint based on the decoded signal.

6. The system of claim 1, further comprising a notification component that sends the notification message for presentation, the notification message indicates a mute status of a device of the endpoint as controlled by the control component.

7. The system of claim 1, wherein the signal is an inaudible signal.

8. The system of claim 1, wherein the control component further controls an audio device of at least one of the one or more other endpoints to manage the echo.

9. An echo management system, comprising:
   a signal component for generating an audio signal for input to an endpoint of a communications session;
   a detection component for detecting the audio signal via one or more other endpoints of the session;
   a control component for controlling the endpoint to mitigate echo based on detection of the audio signal via the one or more other endpoints of the session; and
   a notification component for sending a notification that indicates to the endpoint a change in audio device status of an audio device of the endpoint;
   wherein the signal component adds unique watermark audio signals to corresponding session endpoint communications, each endpoint communication uniquely identified by the corresponding watermark audio signal, and the notification component sends a notification to an offending endpoint when the detection component detects that the watermark audio signal that corresponds to the offending endpoint, the notification indicates to the offending endpoint to mute an audio device or that an audio device of the offending endpoint has been muted.

10. The system of claim 9, wherein the detection component triggers the signal component to generate the audio signal when a speaker or a microphone of the endpoint is unmuted.

11. The system of claim 9, wherein the signal component, the detection component, and the control component are part of a central conferencing component, where the central conferencing component sends the audio signal through the endpoint, detects the audio signal as an output of one or more of the other endpoints, and controls an audio device of the endpoint to reduce the echo.

12. A method of managing echo in a communications session, comprising:

- sensing connect of an endpoint to a communications session that includes one or more nearby endpoints;
- automatically inputting a watermark audio signal as part of an audio signal to the endpoint to test for echo;
- automatically decoding the audio signal as output from the one or more nearby endpoints; and
- automatically managing the echo by adjusting audio device state of the endpoint to mute based on the audio signal as received from the one or more nearby endpoints.

13. The method of claim 12, further comprising automatically muting an audio input device or an audio output device of the endpoint based on the decoded audio signal as received from the one or more nearby endpoints.

14. The method of claim 12, further comprising sending a notification that describes adjustment of the audio device of the endpoint.

15. The method of claim 12, further comprising inputting the audio signal to the endpoint in response to a speaker or a microphone of the endpoint being unmuted or the endpoint joining the session.

16. The method of claim 12, wherein the audio signal is decoded by the endpoint.

17. The method of claim 12, further comprising adjusting audio device state of a nearby endpoint to mitigate the echo.

18. The method of claim 12, further comprising sending a different audio signal to the endpoint and the one or more nearby endpoints to test for the echo.

* * * * *